United States Patent
Kikuta et al.

(10) Patent No.: US 11,796,495 B2
(45) Date of Patent: Oct. 24, 2023

(54) TOTAL REFLECTION X-RAY FLUORESCENCE SPECTROMETER AND ESTIMATION METHOD

(71) Applicant: Rigaku Corporation, Akishima (JP)

(72) Inventors: Shinya Kikuta, Takatsuki (JP); Makoto Doi, Takatsuki (JP)

(73) Assignee: RIGAKU CORPORATION, Tokyo (JP)

( * ) Notice: Subject to any disclaimer, the term of this patent is extended or adjusted under 35 U.S.C. 154(b) by 0 days.

(21) Appl. No.: 18/022,996

(22) PCT Filed: Jun. 9, 2021

(86) PCT No.: PCT/JP2021/021968
§ 371 (c)(1),
(2) Date: Feb. 24, 2023

(87) PCT Pub. No.: WO2022/049854
PCT Pub. Date: Mar. 10, 2022

(65) Prior Publication Data
US 2023/0288353 A1    Sep. 14, 2023

(30) Foreign Application Priority Data

Sep. 3, 2020  (JP) ................. 2020-148517

(51) Int. Cl.
*G01N 23/223* (2006.01)
*G06N 3/0464* (2023.01)

(52) U.S. Cl.
CPC ......... *G01N 23/223* (2013.01); *G06N 3/0464* (2023.01); *G01N 2223/6116* (2013.01)

(58) Field of Classification Search
CPC ............... G01N 23/223; G01N 2223/6116
See application file for complete search history.

(56) References Cited

U.S. PATENT DOCUMENTS

| | | | |
|---|---|---|---|
| 5,490,194 | A | 2/1996 | Komatsu et al. |
| 2006/0029182 | A1 | 2/2006 | Tani et al. |

(Continued)

FOREIGN PATENT DOCUMENTS

| | | |
|---|---|---|
| CN | 103792246 A | 5/2014 |
| JP | H07146259 A | 6/1995 |

(Continued)

OTHER PUBLICATIONS

Cong, Wenxiang, Bruno De Man, and Ge Wang. "X-ray Monochromatic Imaging from Single-spectrum CT via Machine Learning." arXiv preprint arXiv:2006.05841 (2020). (Year: 2020).*

(Continued)

*Primary Examiner* — Raymond L Nimox
(74) *Attorney, Agent, or Firm* — HEA LAW PLLC

(57) ABSTRACT

Provided are a total reflection X-ray fluorescence spectrometer and an estimation method which are capable of easily and quickly estimating whether contamination exists on a substrate through use of a machine learning device. The total reflection X-ray fluorescence spectrometer includes: a spectrum acquisition unit configured to acquire a spectrum; and a learning unit which includes an estimation unit configured to generate estimation data on an element contained in contamination on a surface of a substrate in response to input of the spectrum, and for which learning by the estimation unit has been executed based on teacher data including the spectrum for learning and data on the element contained in the contamination on the surface of the substrate which has been used to acquire the spectrum for learning and the estimation data generated when the spectrum for learning is input to the estimation unit.

6 Claims, 15 Drawing Sheets

(56) References Cited

U.S. PATENT DOCUMENTS

| | | | |
|---|---|---|---|
| 2018/0327699 A1* | 11/2018 | Ota | G06V 10/7784 |
| 2020/0279408 A1 | 9/2020 | Osoekawa et al. | |
| 2020/0300768 A1* | 9/2020 | Hikita | G06N 20/00 |
| 2021/0055211 A1 | 2/2021 | Nagamori et al. | |
| 2021/0131983 A1* | 5/2021 | Ogoshi | G01N 23/2252 |
| 2021/0233232 A1* | 7/2021 | Sugasawa | G06N 20/00 |
| 2021/0248417 A1 | 8/2021 | Taya et al. | |
| 2022/0130027 A1* | 4/2022 | Fukuda | G06T 7/62 |
| 2023/0204527 A1* | 6/2023 | Drake | G01N 23/225 706/12 |

FOREIGN PATENT DOCUMENTS

| | | |
|---|---|---|
| JP | H11248653 A | 9/1999 |
| JP | 2003270177 A | 9/2003 |
| JP | 2010054334 A | 3/2010 |
| JP | 2020101524 A | 7/2020 |
| WO | 2006013728 A1 | 2/2006 |
| WO | 2019039313 A1 | 2/2019 |
| WO | 2019092836 A1 | 5/2019 |
| WO | 2020121918 A1 | 6/2020 |

OTHER PUBLICATIONS

N. Bonettini, M. Paracchini, P. Bestagini, M. Marcon and S. Tubaro, "Hyperspectral X-ray Denoising: Model-Based and Data-Driven Solutions," 2019 27th European Signal Processing Conference (EUSIPCO), A Coruna, Spain, 2019, pp. 1-5, doi: 10.23919/EUSIPCO. 2019.8903151. (Year: 2019).*

Leclerc P, Ray C, Mahieu-Williame L, Alston L, Frindel C, Brevet PF, Meyronet D, Guyotat J, Montcel B, Rousseau D. Machine learning-based prediction of glioma margin from 5-ALA induced PpIX fluorescence spectroscopy. Sci Rep. Jan. 29, 2020;10(1):1462. doi: 10.1038/s41598-020-58299-7. (Year: 2020).*

International Search Report dated Aug. 31, 2021, International Patent Application for PCT/JP2021/021968 with English translation, pp. 1-4.

Office Action dated Apr. 12, 2022, for corresponding JP application No. 2020-148517 with partial English translation, pp. 1-3.

* cited by examiner

FIG.3

| keV | CTS |
|---:|---:|
| 0 | 0 |
| 0.01 | 0 |
| 0.02 | 0 |
| 0.03 | 0 |
| 0.04 | 0 |
| 0.05 | 0 |
| 0.06 | 0 |
| 0.07 | 0 |
| 0.08 | 0 |
| 0.09 | 0 |
| 0.1 | 0 |
| 0.11 | 0 |
| 0.12 | 0 |
| 0.13 | 0 |
| 0.14 | 0 |
| 0.15 | 0 |
| 0.16 | 0 |
| 0.17 | 0 |
| 0.18 | 0 |
| 0.19 | 0 |
| 0.2 | 0 |
| 0.21 | 0 |
| 0.22 | 0 |
| 0.23 | 0 |
| 0.24 | 0 |
| ... | ... |
| 19.81 | 6.862 |
| 19.82 | 4.35 |
| 19.83 | 2.216 |
| 19.84 | 2.182 |
| 19.85 | 3.788 |
| 19.86 | 6.666 |
| 19.87 | 6.204 |
| 19.88 | 6.567 |
| 19.89 | 5.735 |
| 19.9 | 4.558 |
| 19.91 | 4.685 |
| 19.92 | 1.837 |
| 19.93 | 3.101 |
| 19.94 | 3.995 |
| 19.95 | 5.151 |
| 19.96 | 4.373 |
| 19.97 | 1.696 |
| 19.98 | 6.015 |
| 19.99 | 3.847 |

| ELEMENT | ABSENCE/PRESENCE |
|---|---|
| Si | 1 |
| P | 0 |
| S | 1 |
| Cl | 1 |
| Ar | 1 |
| K | 0 |
| Ca | 1 |
| Sc | 0 |
| Ti | 1 |
| V | 0 |
| Cr | 0 |
| Mn | 1 |
| Fe | 1 |
| Co | 1 |
| Ni | 1 |
| Cu | 0 |
| Zn | 1 |

(b)

| ELEMENT | INTENSITY (cps) |
|---|---|
| Si | 2485.11 |
| P | 0 |
| S | 2.177 |
| Cl | 1.585 |
| Ar | 6.803 |
| K | 0 |
| Ca | 50.423 |
| Sc | 0 |
| Ti | 270.364 |
| V | 0 |
| Cr | 0 |
| Mn | 2.349 |
| Fe | 883.948 |
| Co | 10.195 |
| Ni | 3.817 |
| Cu | 0 |
| Zn | 5.862 |

TOTAL REFLECTION X-RAY FLUORESCENCE SPECTROMETER AND ESTIMATION METHOD

CROSS REFERENCE TO RELATED APPLICATIONS

This application is a National Stage of International Application No. PCT/JP2021/021968 filed on Jun. 9, 2021 which claims priority from Japanese Patent Application 2020-148517, filed on Sep. 3, 2020. The contents of the above document is incorporated herein by reference in its entirety.

TECHNICAL FIELD

The present invention relates to a total reflection X-ray fluorescence spectrometer and an estimation method.

BACKGROUND ART

Hitherto, there has been known a method of analyzing a spectrum through use of a machine learning device. For example, in Patent Literature 1, there is disclosed a spectral analysis device including a convolutional neural network which acquires an optical spectrum having absorbance assigned to a vertical axis and a wavenumber assigned to a horizontal axis through use of an infrared spectroscope, and then analyzes a compound such as a foreign substance contained in a target sample based on the optical spectrum.

Moreover, in Patent Literature 2, there are disclosed such a point that a peak detection processor is caused to learn to acquire a peak height and a peak area value included in a spectrum, and a waveform analyzer including this peak detection processor.

Further, in Patent Literature 3, there is disclosed an information processing apparatus which inputs spectrum information on a sample containing a test substance and impurities to a learning model, to thereby estimate quantitative information on the test substance.

CITATION LIST

Patent Literature

[PTL 1] WO 2019/039313 A1
[PTL 2] WO 2019/092836 A1
[PTL 3] JP 2020-101524 A

SUMMARY OF INVENTION

Technical Problem

Incidentally, there is known an X-ray fluorescence spectrometer as a device for analyzing elements contained in a sample. The X-ray fluorescence spectrometer irradiates the sample with primary X-rays, and acquires a spectrum representing a relationship between intensities, and energies, of emitted fluorescent X-rays. Elements contained in the sample are analyzed through use of peak fitting for each peak included in this spectrum.

For example, the X-ray fluorescence spectrometer is used to inspect whether or not contamination exists on a surface of a substrate in a production line for semiconductors. In particular, a total reflection X-ray fluorescence spectrometer having high detection sensitivity is used in order to determine whether or not minute contamination exists.

However, even when the total reflection X-ray fluorescence spectrometer is used, when an adhesion amount of the contamination is extremely small, a ratio (SN ratio) of the peak and the noise included in the spectrum is small, and the above-mentioned determination may be difficult. In particular, when a measurement time is reduced in order to execute many inspections in the same time, the SN ratio of the spectrum decreases, and highly accurate determination cannot be made.

The present invention has been made in view of the above-mentioned problem, and has an object to provide a total reflection X-ray fluorescence spectrometer and an estimation method which are capable of easily and quickly determining whether or not contamination exists on a substrate through use of a machine learning device.

Solution to Problem

According to claim 1, there is provided a total reflection X-ray fluorescence spectrometer including: a spectrum acquisition unit configured to acquire a spectrum representing a relationship between intensities, and energies, of emitted fluorescent X-rays by irradiating a surface of a substrate with primary X-rays at a total reflection critical angle or less; and a learning unit which includes an estimation unit configured to generate estimation data on an element contained in contamination on the surface of the substrate in response to input of the spectrum, and for which learning by the estimation unit has been executed based on teacher data including the spectrum for learning, and data on the element contained in the contamination on the surface of the substrate which has been used to acquire the spectrum for learning, with and the estimation data generated when the spectrum for learning is input to the estimation unit.

According to the total reflection X-ray fluorescence spectrometer of claim 2, the total reflection X-ray fluorescence spectrometer of claim 1 further includes an analysis unit configured to analyze the element contained in the contamination based on the spectrum, through use of a fundamental parameter method or a calibration curve method, and the data on the element contained in the contamination on the surface of the substrate, which is included in the teacher data, is an analysis result obtained by the analysis unit.

According to the total reflection X-ray fluorescence spectrometer of claim 3, in the total reflection X-ray fluorescence spectrometer of claim 1 or 2, the estimation data is data indicating whether the element contained in the contamination exists.

According to the total reflection X-ray fluorescence spectrometer of claim 4, in the total reflection X-ray fluorescence spectrometer of claim 1 or 2, the estimation data is data representing a quantitative value of the element contained in the contamination.

According to the total reflection X-ray fluorescence spectrometer of claim 5, in the total reflection X-ray fluorescence spectrometer of any one of claims 1 to 4, the substrate is a silicon substrate, and the element contained in the contamination is a plurality of elements determined in advance.

According to claim 6, there is provided an estimation method including: a spectrum-for-learning acquisition step of acquiring a spectrum for learning representing a relationship between intensities, and energies, of emitted fluorescent X-rays by irradiating a surface of a substrate with primary X-rays at a total reflection critical angle or less; a learning step of executing learning for an estimation unit based on teacher data including the spectrum for learning and data on an element contained in contamination on the surface of the substrate which has been used to acquire the spectrum for learning, and estimation data generated when the spectrum for learning is input to the estimation unit; a spectrum-for-analysis acquisition step of acquiring a spectrum for analysis representing a relationship between intensities, and energies, of emitted fluorescent X-rays by irradiating a surface of a substrate for which whether the element contained in the contamination exists on the surface is unknown with primary X-rays at a total reflection critical angle or less; and an estimation data generation step of generating, using the estimation unit, the estimation data in response to input of the spectrum for analysis.

According to the estimation method of claim 7, in the estimation method of claim 6, the spectrum-for-learning acquisition step includes acquiring a first spectrum for learning and a second spectrum for learning, the teacher data in the learning step includes an analysis result of the element contained in the contamination based on the first spectrum for learning and the second spectrum for learning through use of a fundamental parameter method or a calibration curve method, and a time for acquiring the first spectrum for learning is shorter than a time for acquiring the second spectrum for learning.

According to the estimation method of claim 8, in the estimation method of claim 6 or 7, a plurality of items of the teacher data are acquired based on the same measurement point of one substrate.

Advantageous Effects of Invention

According to the inventions of claim 1 to claim 8, it is possible to easily and quickly determine whether or not the contamination exists on the substrate.

According to the invention of claim 8, it is possible to easily collect the teacher data required for the machine learning.

BRIEF DESCRIPTION OF DRAWINGS

FIG. 3 is a table for showing an example of input data.

FIG. 5 are tables for showing examples of output data.

DESCRIPTION OF EMBODIMENTS

Figure 1:
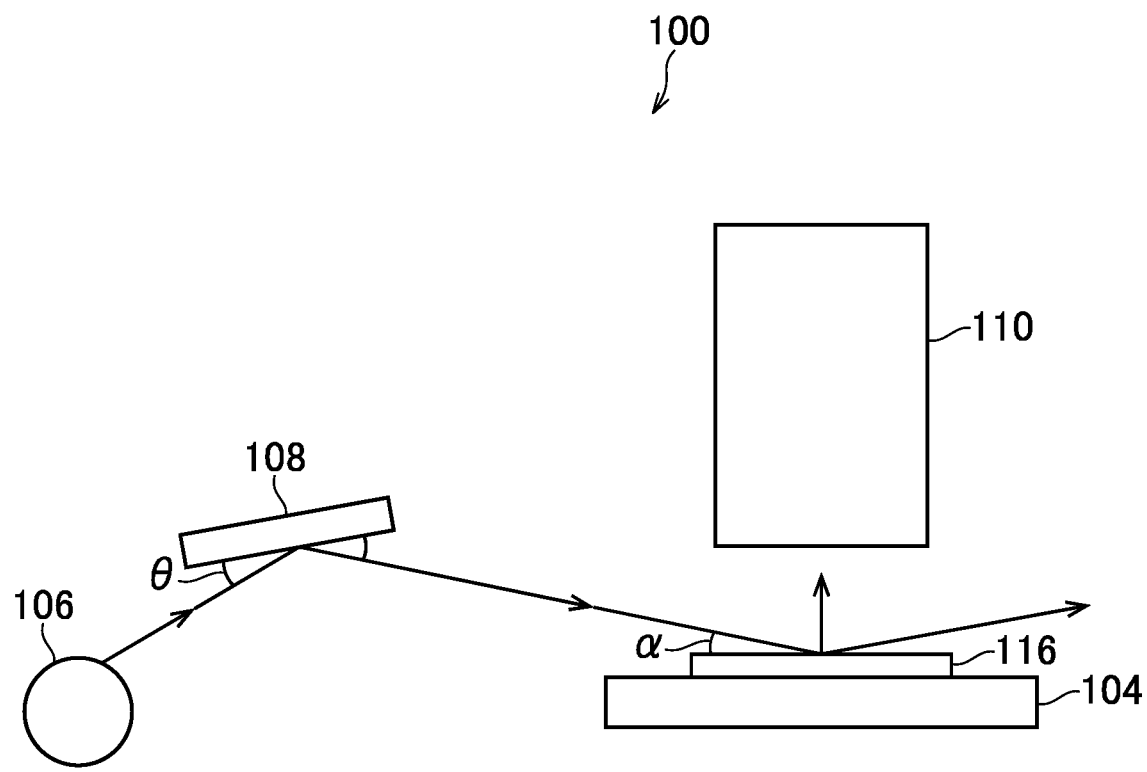
FIG. 1 is a diagram for schematically illustrating a hardware configuration of a total reflection X-ray fluorescence spectrometer.

Now, a preferred embodiment for carrying out the present invention (hereinafter referred to as "embodiment") will be described. FIG. 1 is a diagram for illustrating an example of a schematic hardware configuration of a total reflection X-ray fluorescence spectrometer 100.

As illustrated in FIG. 1, the total reflection X-ray fluorescence spectrometer 100 acquires a spectrum representing a relationship between intensities, and energies, of emitted fluorescent X-rays by irradiating a surface of a substrate with primary X-rays at a total reflection critical angle or less. Specifically, for example, the total reflection X-ray fluorescence spectrometer 100 includes a sample stage 104, an X-ray source 106, a monochromator 108, and a detection unit 110.

On the sample stage 104, a sample 116 to be analyzed is placed. Description will now be given of a case in which the sample 116 is a substrate. The substrate is a silicon substrate used to produce, for example, semiconductor products. Elements contained in contamination are a plurality of elements determined in advance. For example, the elements contained in the contamination are elements such as Si, P, S, Cl, Ar, K, Ca, Sc, Ti, V, Cr, Mn, Fe, Co, Ni, Cu, and Zn, which are likely to be mixed in a semiconductor plant which produces or processes the silicon substrates. The elements contained in the contamination may be other elements as long as the elements are set in advance when learning described later is executed. The substrate may be a substrate formed of elements other than silicon, such as GaAs, GaN, SiC, and quartz.

The X-ray source 106 emits primary X-rays. The primary X-rays emitted by the X-ray source 106 have various energies.

The monochromator 108 extracts primary X-rays having a specific energy from the primary X-rays having various energies emitted from the X-ray source 106. The monochromator 108 is arranged between the X-ray source 106 and the substrate. The surface of the substrate is irradiated with the primary X-rays having the specific energy at an incident angle equal to or smaller than a degrees. The a degrees is the total reflection critical angle. From the substrate irradiated with the primary X-rays, fluorescent X-rays are emitted.

The detection unit 110 includes a detector and a counter. The detector is, for example, a semiconductor detector such as a silicon drift detector (SDD). The detector measures intensities of the florescent X-rays (florescent X-rays and scattered rays), and outputs a pulse signal having pulse heights corresponding to energies of the measured florescent X-rays.

The counter counts the pulse signal output from the detector in accordance with the pulse heights. Specifically, for example, the counter is a multi-channel analyzer, and counts the output pulse signal of the detector for each channel corresponding to the energy, and outputs the result as the intensities of the fluorescent X-rays. The detection unit 110 acquires output of the counter as a spectrum.

Operations of the sample stage 104, the X-ray source 106, the monochromator 108, and the detection unit 110 are controlled by a control unit (not shown). Specifically, the control unit is, for example, a personal computer. The control unit transmits and receives instruction commands to and from each of the components, to thereby control the operations of the sample stage 104, the X-ray source 106, the detection unit 110, and the monochromator 108.

Figure 2:
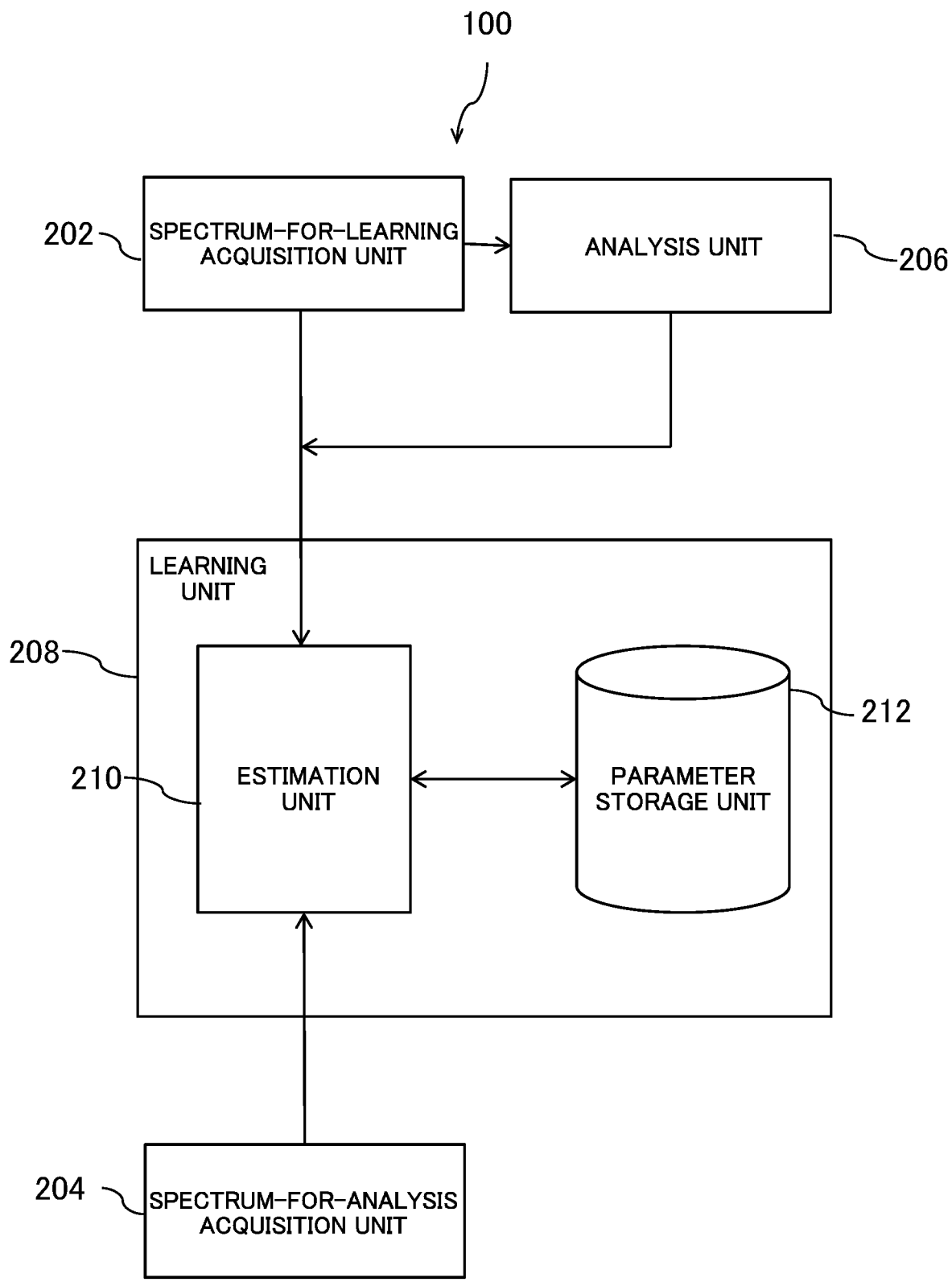
FIG. 2 is a block diagram for schematically illustrating a functional configuration of the total reflection X-ray fluorescence spectrometer.

Description will now be given of a functional configuration of the total reflection X-ray fluorescence spectrometer 100. FIG. 2 is a block diagram for schematically illustrating the functional configuration of the total reflection X-ray fluorescence spectrometer 100. As illustrated in FIG. 2, the total reflection X-ray fluorescence spectrometer 100 includes a spectrum-for-learning acquisition unit 202, a spectrum-for-analysis acquisition unit 204, an analysis unit 206, and a learning unit 208.

The spectrum-for-learning acquisition unit 202 acquires a spectrum for learning. The spectrum for learning is a spectrum for learning which represents a relationship between the intensities, and the energies, of the fluorescent X-rays emitted when the surface of the substrate is irradiated with the primary X-rays at the total reflection critical angle or less, and is used for learning for the learning unit 208.

Specifically, for example, the spectrum-for-learning acquisition unit 202 acquires a spectrum for learning having a one-dimensional data structure representing a relationship between the energies and the intensities of the fluorescent X-rays, which is shown in FIG. 3. The data of FIG. 3 corresponds to output of Channel 1 to Channel 2,000 of the counter, in the order from the top to the bottom. As will be described later, the spectrum for learning may be measurement data acquired by the detection unit 110 or theoretical data acquired through calculation.

The spectrum-for-analysis acquisition unit 204 acquires a spectrum for analysis. The spectrum for analysis is a spectrum for analysis representing a relationship between the intensities and the energies of the emitted fluorescent X-rays, and is used to analyze the substrate. Specifically, for example, the spectrum-for-analysis acquisition unit 204 acquires a spectrum for analysis having a one-dimensional data structure representing the relationship between the energies and the intensities of the fluorescent X-rays, which is shown in FIG. 3, in the same manner as in the spectrum-for-learning acquisition unit 202. That is, the spectrum for analysis is measurement data acquired by the detection unit 110.

The analysis unit 206 analyzes the elements contained in the contamination based on the spectrum through use of a fundamental parameter method or a calibration curve method. Specifically, for example, the analysis unit 206 executes fitting for each of the peaks included in the spectrum acquired by the detection unit 110, to thereby acquire an approximation function. The approximation function for each peak is represented by a theoretical intensity calculated through use of quantitative values of each element, physical constants, device constants, and the like, and an appropriate function such as a Gaussian function representing a shape of the peak. The analysis unit 206 applies the peak fitting to the spectrum, to thereby analyze whether or not elements contained in the contamination exist.

Moreover, the analysis unit 206 calculates a peak intensity based on a spectrum within a set energy range, and executes quantitative analysis for the elements based on the calculated peak intensity.

The learning unit 208 includes an estimation unit 210 and a parameter storage unit 212. The estimation unit 210 generates estimation data on the elements contained in the contamination on the surface of the substrate in response to the input of the spectrum. The estimation data is data indicating whether or not the elements contained in the contamination exist. Moreover, the estimation data may be data indicating quantitative values of the elements contained in the contamination.

Further, learning has been executed for the estimation unit 210 based on teacher data, including the spectrum for learning, and data on the elements contained in the contamination on the surface of the substrate which has been used to acquire the spectrum for learning, and estimation data generated when the spectrum for learning is input to the estimation unit.

Figure 4:
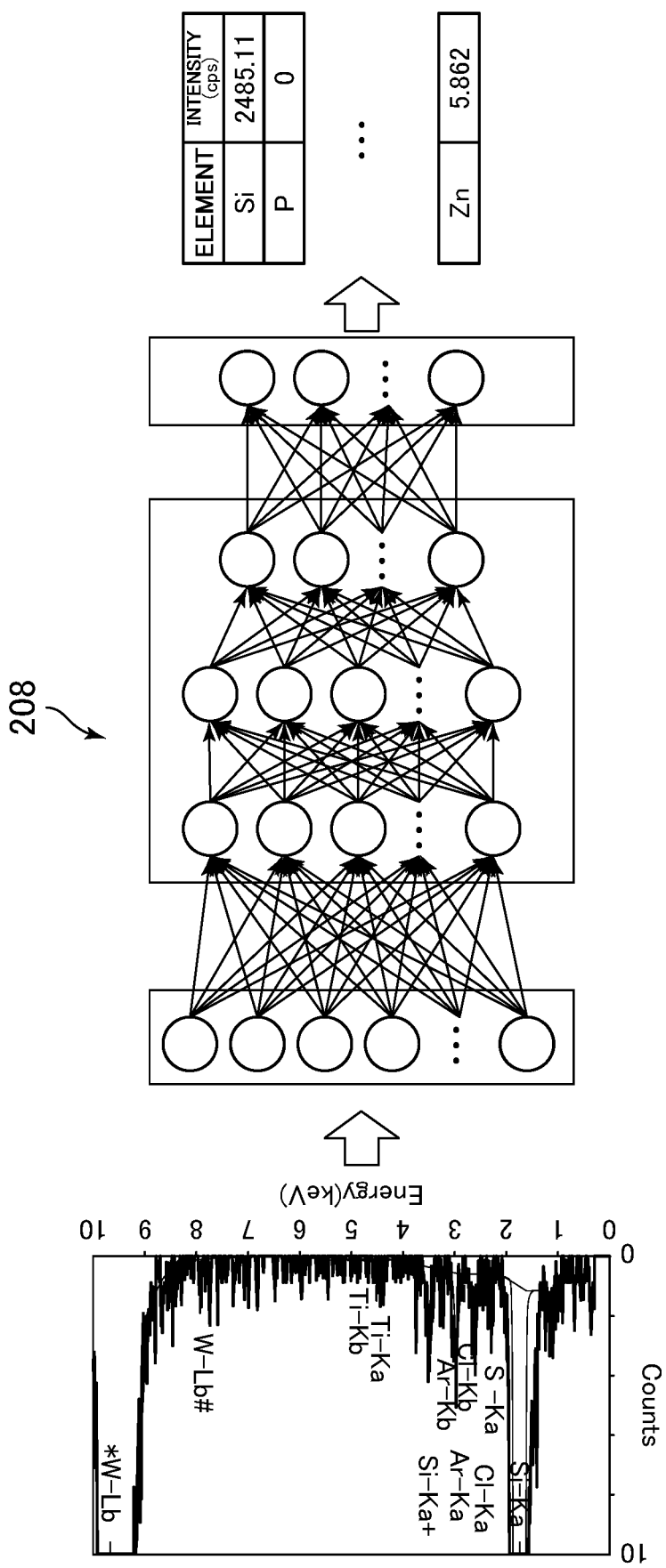
FIG. 4 is a diagram for illustrating processing executed by a learning unit.

Specifically, for example, as illustrated in FIG. 4, the estimation unit 210 is a machine learning model implemented by convolutional neural networks (CNNs). The estimation unit 210 may be a machine learning model simply implemented by neural networks (NNs). The estimation unit 210 receives input of data which has the one-dimensional data structure and represents the relationship between the energies and the intensities of the fluorescent X-rays as shown in FIG. 3. In FIG. 4, this data is represented as a spectrum.

After that, the estimation unit 210 generates the estimation data in response to the input of the spectrum. In the example of FIG. 5(a), the estimation data is data which indicates each element contained in the contamination and whether or not each element exists, and has a one-dimensional data structure. In the data indicating whether or not the element contained in the contamination exists, for example, information indicating that the element contained in the contamination exists is represented by 1, and information indicating that the element contained in the contamination does not exist is represented by 0.

In the example of FIG. 5(b), the estimation data is data which indicates quantitative values of the elements contained in the contamination, and has a one-dimensional data structure. The data which indicates the quantitative values of the elements contained in the contamination is, for example, information indicating the intensity of each element contained in the contamination. An adhesion amount of each element can be calculated based on the intensity of each element, and hence the intensity of each element of FIG. 5(b) corresponds to the quantitative value.

Figure 6:
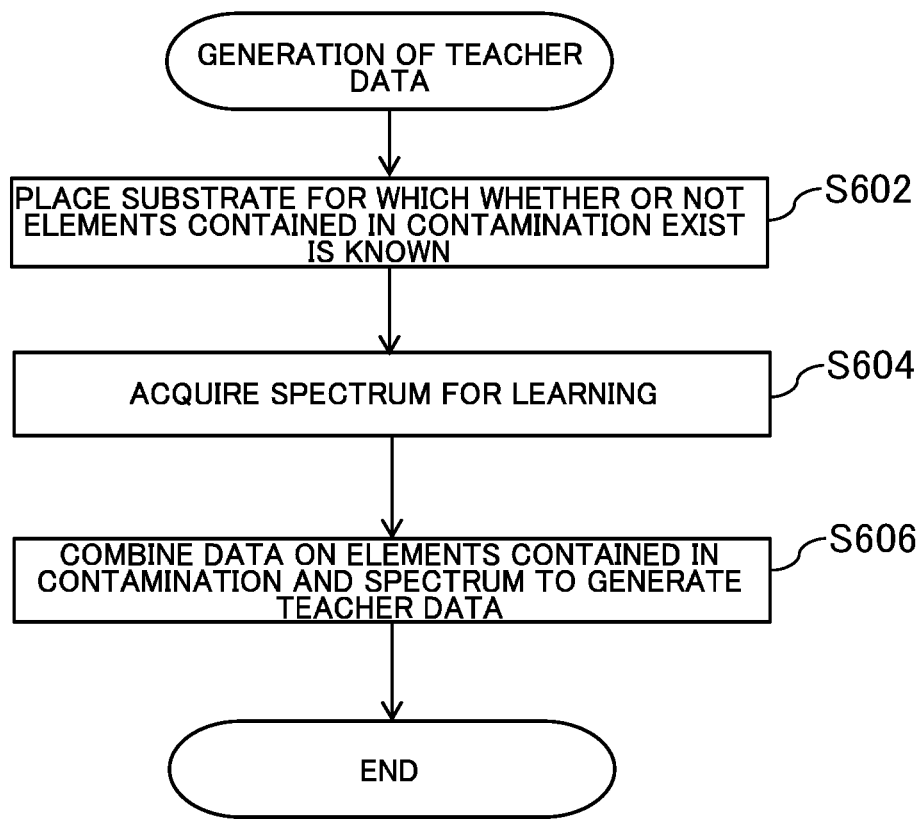
FIG. 6 is a flowchart for illustrating an example of a method of generating teacher data.

With reference to flowcharts of FIG. 6 to FIG. 9, description will now be given of the learning executed by the learning unit 208. FIG. 6 is a flowchart for illustrating an example of a method of generating teacher data.

First, a substrate is placed on the sample stage 104 (Step S602). Specifically, a substrate for which whether or not the contamination adheres to a predetermined position of a substrate surface is known is placed on the sample stage 104. In this case, the substrate is placed such that the predetermined position on the substrate surface is a position irradiated with the primary X-rays. Moreover, the quantitative values of the elements contained in the contamination may be known.

After that, the spectrum-for-learning acquisition unit 202 acquires the spectrum for learning (Step S604). Specifically, the surface of the substrate is irradiated with the primary X-rays at the total reflection critical angle or less, and the spectrum-for-learning acquisition unit 202 acquires the spectrum for learning representing the relationship between the intensities of the emitted fluorescent X-rays and the energies. In this case, the predetermined position on the substrate surface is irradiated with the primary X-rays for, for example, 5 seconds.

After that, the teacher data is generated (Step S606). Specifically, the data in Step S602 for which whether or not the elements contained in the contamination exist is known, and the spectrum for learning acquired in Step S604, are combined to generate one item of teacher data. When the quantitative values of the elements contained in the contamination are known in Step S602, those quantitative values and the spectrum for learning acquired in Step S604 may be combined to generate one item of teacher data.

Step S602 to Step S606 are repeated a plurality of times until a required number of items of teacher data for the learning are collected. A plurality of items of the teacher data may be acquired based on the same measurement point of one substrate. That is, while the processing step of Step S602 is executed one time, the processing step of Step S604 may be executed a plurality of times. In this case, a plurality of items of teacher data are generated by combining the data on the known elements contained in the contamination in Step S602 with each of the plurality of spectra acquired in Step S604.

Figure 7:
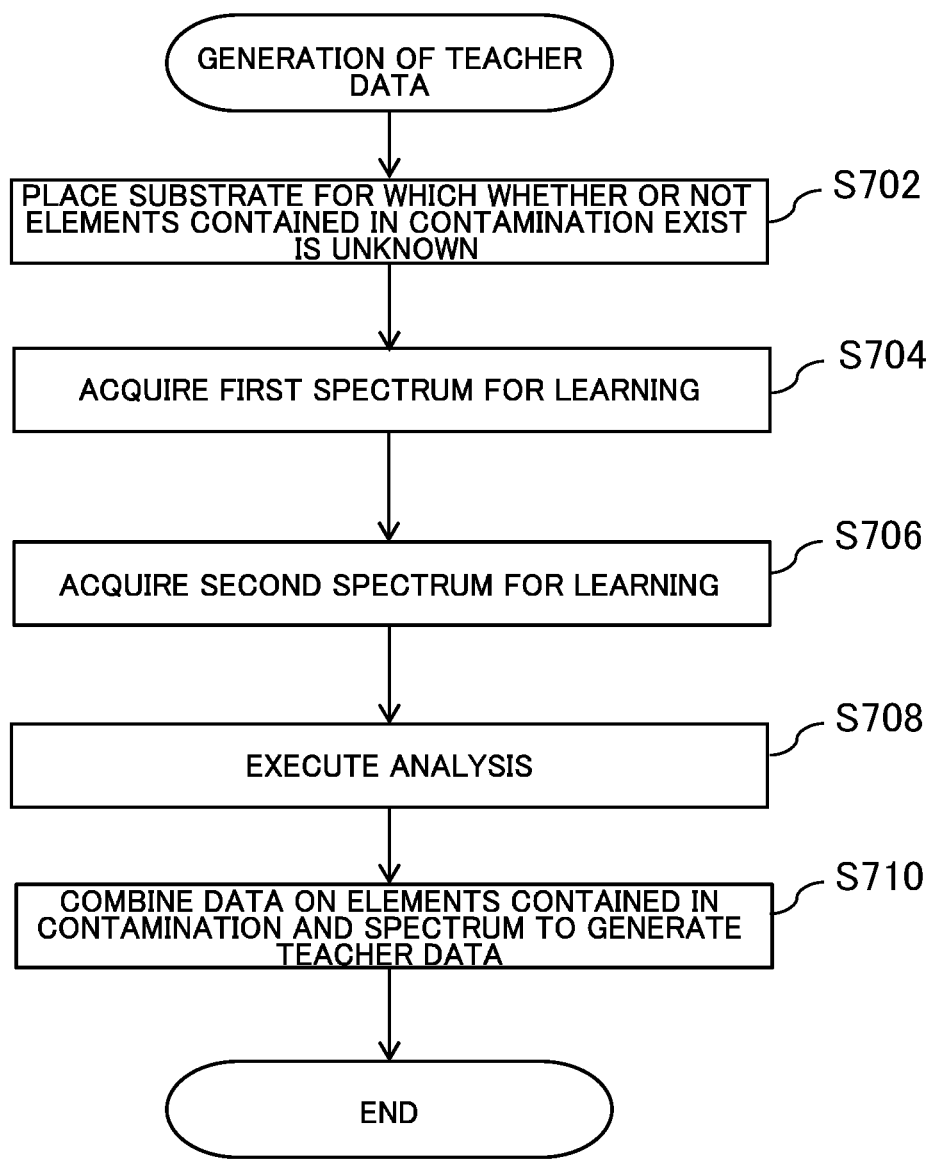
FIG. 7 is a flowchart for illustrating another example of the method of generating teacher data.

FIG. 7 is a flowchart for illustrating another example of the method of generating teacher data. First, a substrate is placed on the sample stage 104 (Step S702). Specifically, a substrate for which whether or not the elements contained in the contamination exist at a predetermined position of a substrate surface is not known is placed on the sample stage 104. In this case, the substrate is placed such that the predetermined position on the substrate surface is a position irradiated with the primary X-rays. Moreover, the quantitative values of the elements contained in the contamination are also not known.

After that, the spectrum-for-learning acquisition unit 202 acquires a first spectrum for learning (Step S704). Specifically, the X-ray source 106 irradiates, through the monochromator 108, the surface of the substrate with the primary X-rays at the total reflection critical angle or less, and the spectrum-for-learning acquisition unit 202 acquires a spectrum representing the relationship between the intensities and the energies of the emitted fluorescent X-rays. In this case, the predetermined position on the substrate surface is irradiated with the primary X-rays for, for example, 5 seconds.

After that, the spectrum-for-learning acquisition unit 202 acquires a second spectrum for learning (Step S706). Specifically, the X-ray source 106 irradiates, through the monochromator 108, the surface of the substrate with the primary X-rays at the total reflection critical angle or less, and the spectrum-for-learning acquisition unit 202 acquires a spectrum representing the relationship between the intensities and the energies of the emitted fluorescent X-rays. In this case, a time for acquiring the first spectrum for learning is shorter than a time for acquiring the second spectrum for learning. For example, in Step S706, the predetermined position on the substrate surface is irradiated with the primary X-rays for, for example, 60 seconds.

After that, the analysis unit 206 carries out the analysis (Step S708). Specifically, the analysis unit 206 uses the second spectrum for learning acquired in Step S706 to analyze whether or not the elements contained in the contamination exist through use of the fundamental parameter method or the calibration curve method. Moreover, the analysis unit 206 may also analyze, in addition to analyzing whether or not the elements contained in the contamination exist, the quantitative values of the elements contained in the contamination.

After that, the teacher data is generated (Step S710). Specifically, the result of the analysis in Step S708 and the spectrum for learning acquired in Step S704 are combined to generate one item of teacher data. That is, the teacher data includes the first spectrum for learning and the analysis result of the elements contained in the contamination through use of the fundamental parameter method or the calibration curve method based on the second spectrum for learning. The data contained in the teacher data and indicating whether or not the elements exist is the analysis result obtained by the analysis unit 206. When the quantitative values of the elements contained in the contamination are analyzed in Step S708, those quantitative values and the first spectrum for learning acquired in Step S704 may be combined to generate one item of teacher data.

In the same manner as described above, the processing steps of Step S702 to Step S710 are repeated a plurality of times until the required number of items of teacher data for the learning are collected. Moreover, the processing step of Step S704 may be executed a plurality of times for one set of the processing steps of Step S706 and Step S708. In this case, a plurality of items of the teacher data are generated by combining the analysis result in Step S708 with each of the plurality of first spectra for learning acquired in Step S704.

In the method of FIG. 7, the time for acquiring the first spectrum for learning is shorter than the time for acquiring the second spectrum for learning. Thus, the result of the analysis of the second spectrum for learning is higher in accuracy of the analysis than the result of the analysis of the first spectrum for learning. Accordingly, the teacher data is generated by combining the analysis result having the higher accuracy than the analysis result of the first spectrum for learning, with the first spectrum for learning acquired in the shorter time.

The predetermined position in the description of FIG. 6 and FIG. 7 is a measurement position. The predetermined position may be any measurement position which is a certain position defined in advance on the substrate, and is, for example, the center of the substrate.

Figure 8:
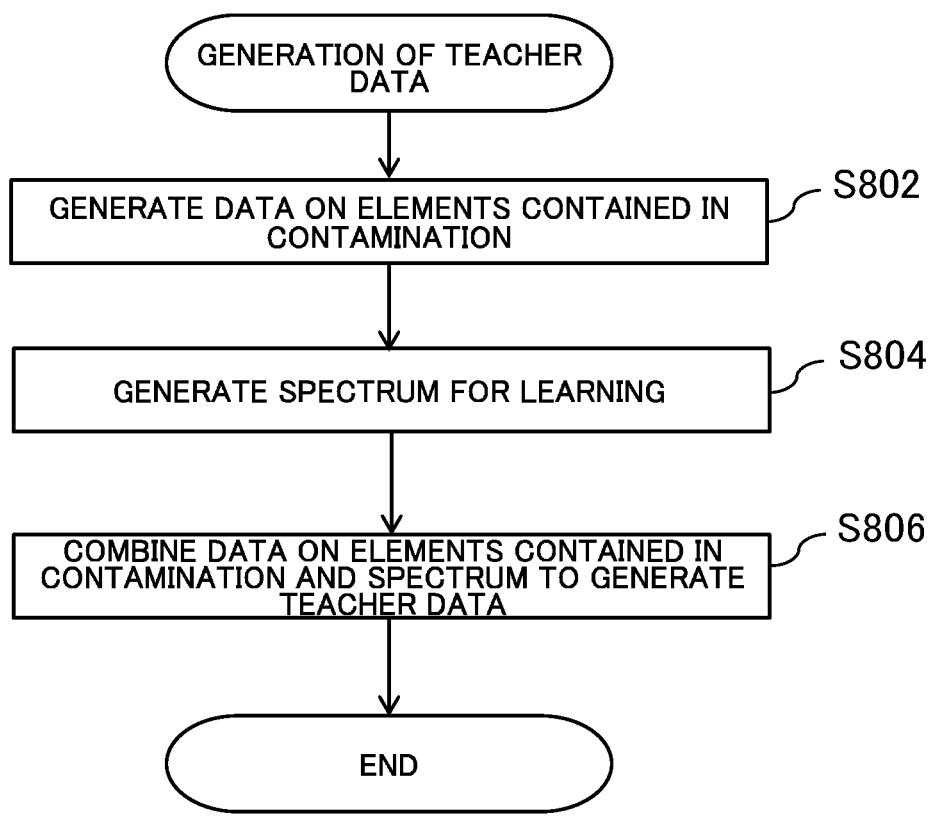
FIG. 8 is a flowchart for illustrating still another example of the method of generating teacher data.

FIG. 8 is a flowchart for illustrating still another example of the method of generating teacher data. First, information indicating whether or not predetermined contamination exists is generated (Step S802). Specifically, for example, the control unit uses a random number to generate data indicating whether or not each element which is likely to adhere to the surface of the substrate exists. Moreover, the control unit uses a random number to generate the quantitative value of each element in addition to the data indicating whether or not each element exists.

After that, a spectrum for learning is generated (Step S804). Specifically, the control unit uses the quantitative value of each element generated in Step S802, physical constants, and device constants, to calculate a theoretical intensity for each energy. In this case, the physical constants and the device constants are appropriately set in accordance with an environment in which the present invention is embodied. The spectrum-for-learning acquisition unit 202 acquires a theoretical profile obtained through this calculation as the spectrum for learning. The calculation is executed through use of related art, such as the fundamental parameter method.

After that, the teacher data is generated (Step S806). Specifically, the data generated in Step S802 and indicating whether or not the elements contained in the contamination exist, and the spectrum for learning generated in Step S804, are combined to generate one item of teacher data. In the same manner as described above, the processing steps of Step S802 to Step S806 are repeated a plurality of times until the required number of items of teacher data for the learning are collected.

Any one of the flowcharts of FIG. 6 to FIG. 8 may be used to generate the teacher data, or two or three flowcharts thereof may be used to generate the teacher data.

Figure 9:
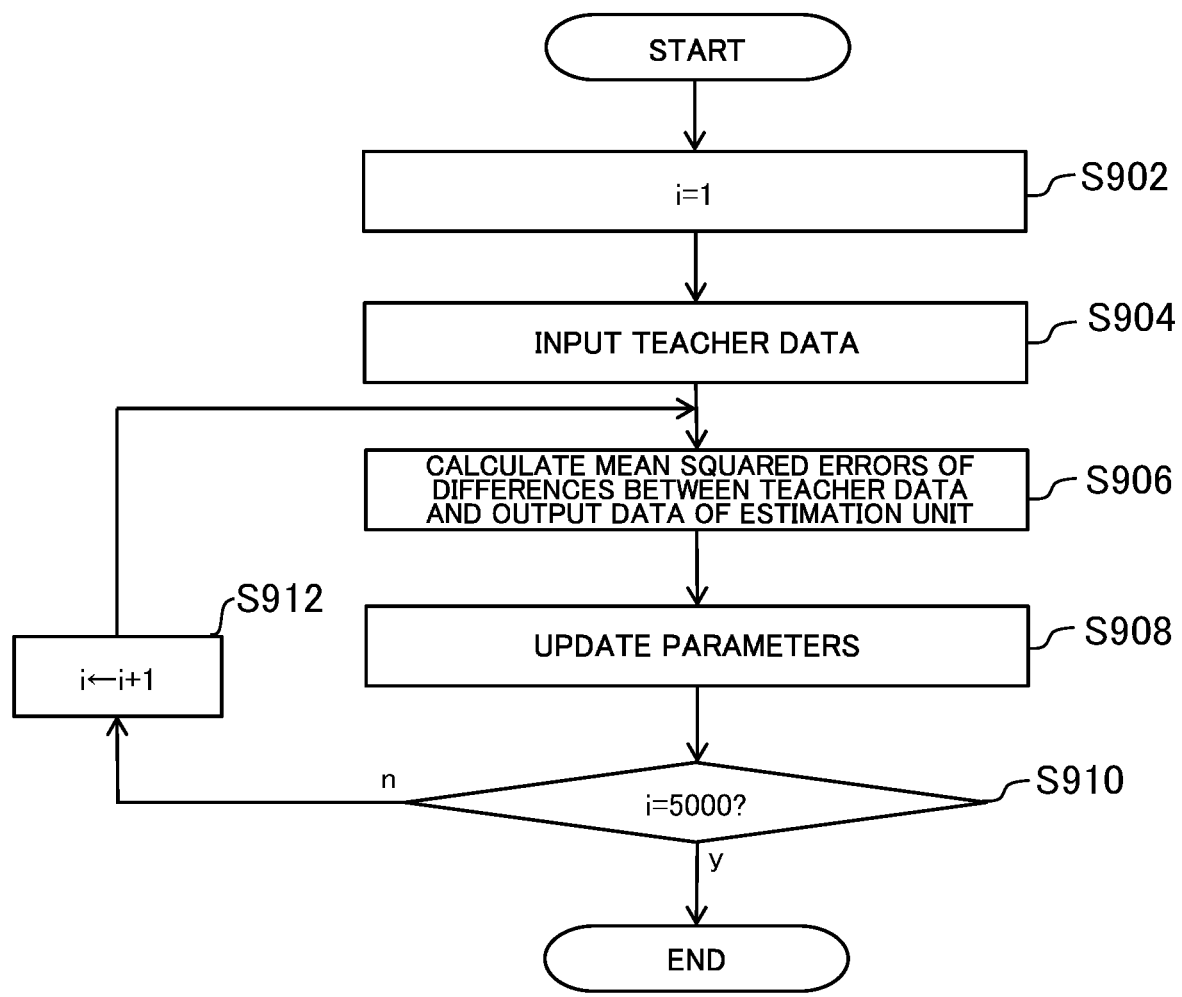
FIG. 9 is a flowchart for illustrating a method of causing an estimation unit included in the learning unit to learn.

FIG. 9 is a flowchart for illustrating a method of executing the learning for the estimation unit 210 included in the learning unit 208. It is assumed that the estimation unit 210 is a machine learning model implemented by the convolutional neural networks (CNNs). Moreover, a neural network model (hereinafter referred to as "first CNN") which outputs the data indicating whether or not the elements contained in the contamination exist and a neural network model (hereinafter referred to as "second CNN") which outputs the quantitative values of the elements contained in the contamination are individually built in advance. First, "i," which is an internal variable, is set to 1 (Step S902).

After that, the teacher data is input to the estimation unit 210 (Step S904). Specifically, when "i" is 1, the spectrum for learning and the data indicating whether or not the elements contained in the contamination exist are input to the first CNN. As shown in FIG. 5(a), in the data indicating whether or not the elements contained in the contamination exist, a case in which each of the elements contained in the contamination exists is indicated by 1, and a case in which each of the elements does not exist is indicated by 0. When this spectrum for learning is input, the first CNN outputs a probability of the existence of each of the elements contained in the contamination as a numerical value of from 0 to 1.

Moreover, the spectrum for learning and the quantitative value of each of the elements contained in the contamination of FIG. 5(b) are input to the second CNN. When this spectrum for learning is input, the second CNN outputs the quantitative value of each of the elements contained in the contamination.

After that, mean squared errors are calculated (Step S906). Specifically, the learning unit 208 calculates a mean squared error of differences each between the value representing the probability of the existence of each of the elements contained in the contamination, which is output by the estimation unit 210, and the data indicating whether or not each of the elements exists, which is input in Step S904. Moreover, the learning unit 208 calculates a mean squared error of differences between each quantitative value of each of the elements output by the estimation unit 210, and the quantitative value of each of the elements input in Step S904.

After that, parameters are updated (Step S908). Specifically, the learning unit 208 uses back propagation to update the parameters of the first CNN and the second CNN such that the mean squared errors decrease. The parameters are internal constants of the first CNN and the second CNN, and are values each used, for example, to weight each node. The updated parameters are stored in the parameter storage unit 212.

After that, whether or not "i" is 5,000 is determined (Step S910). When a determination of "No" is made, "i" is incremented (Step S912), and the process returns to Step S906. In this case, the learning of the first CNN and the second CNN is further executed, and the parameters are updated again. Meanwhile, when a determination of "Yes" is made in Step S910, the learning is finished.

As described above, the learning is executed by repeating the update of the parameters. The case in which the update of the parameters is executed 5,000 times has been described with reference to FIG. 9, but the configuration is not limited to this example. For example, in Step S906, the learning may be finished when the mean squared errors fall below a predetermined value.

Moreover, the case in which the second CNN is caused to learn along with the first CNN has been described, but when the quantitative analysis for the elements is not executed, only the learning of the first CNN may be executed. Further, when whether or not the elements contained in the contamination exist is determined based on a result of the quantitative analysis, only the learning of the second CNN may be executed.

Moreover, the case in which the estimation unit 210 is the machine learning model in which the first CNN and the second CNN are individually implemented has been described, but the machine learning model can be appropriately designed. For example, the estimation unit 210 may be a machine learning model implemented by a single convolutional neural network which outputs the quantitative values together with the data indicating whether or not the elements exist.

Figure 10:
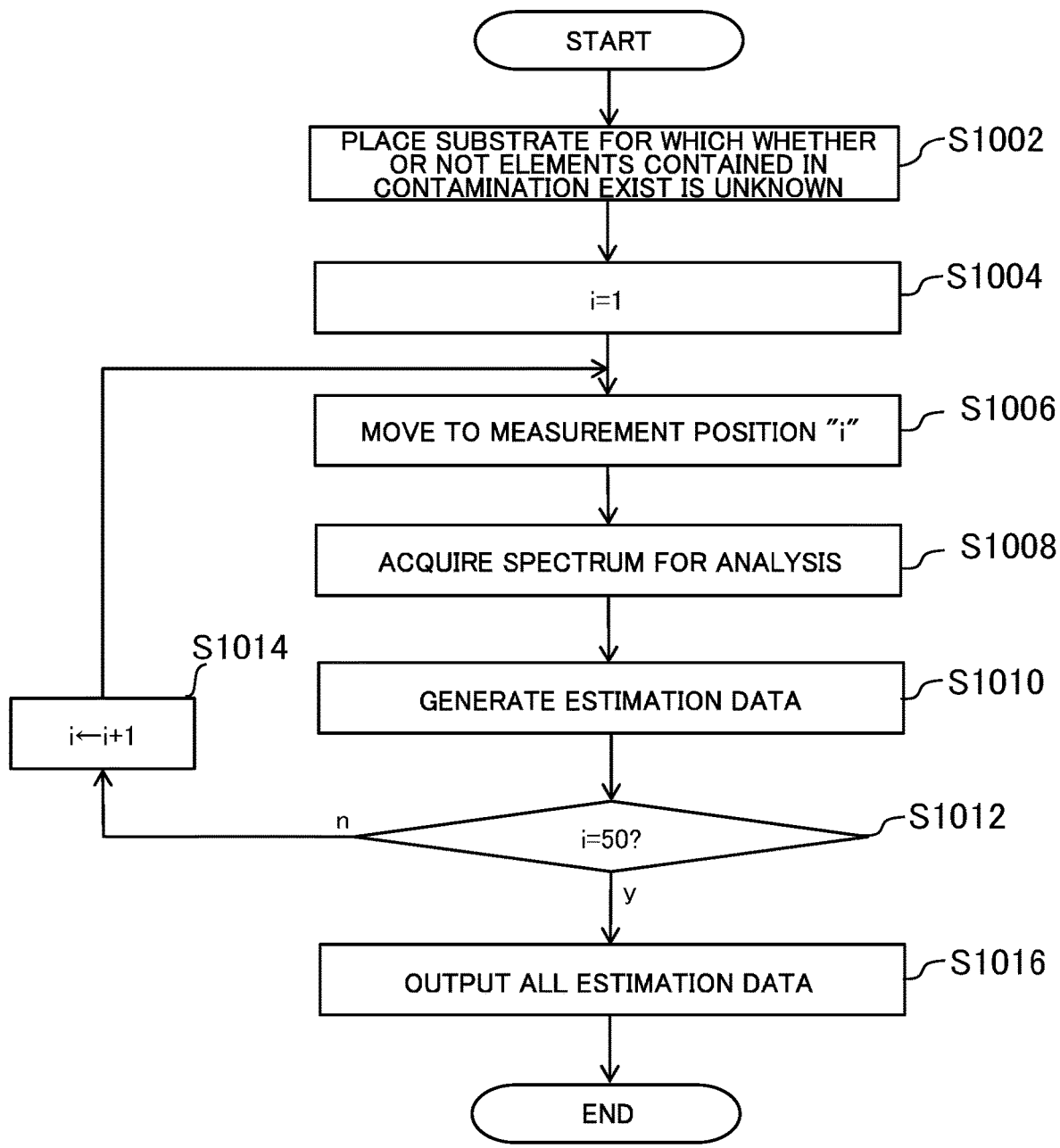
FIG. 10 is a flowchart for illustrating an estimation method.

Description will now be given of a method of estimating whether or not the elements contained in the contamination exist on a surface of a substrate and the quantitative values of the elements through use of the learned estimation unit 210. FIG. 10 is a flowchart for illustrating this estimation method. It is assumed that a spectrum-for-learning acquisition step and a learning step have been completed by executing the flowcharts of FIG. 6 to FIG. 9.

First, the substrate is placed on the sample stage 104 (Step S1002). Specifically, a substrate for which whether or not the elements contained in the contamination exist on the substrate surface is not known is placed on the sample stage 104. This substrate is a target for which whether or not the elements contained in the contamination exist, and the quantitative values of the elements, are analyzed.

After that, "i", which is the internal variable, is set to 1 (Step S1004).

Then, the sample stage 104 moves the substrate such that a position on the substrate to be analyzed is a position corresponding to the internal variable "i" (Step S1006). The position on the substrate to be analyzed is unique for each internal variable "i".

After that, a spectrum for analysis is acquired (Step S1008). Specifically, the surface of the substrate is irradiated with the primary X-rays at the total reflection critical angle or less, and the spectrum-for-analysis acquisition unit 204 acquires the spectrum for the analysis representing the relationship between the intensities of the emitted fluorescent X-rays and the energies. In this case, the position which is the position corresponding to the internal variable "i", and that is the position on the substrate to be analyzed, is irradiated with the primary X-rays for 5 seconds.

After that, the estimation unit 210 generates the estimation data (Step S1010). Specifically, the estimation unit 210 generates the estimation data indicating whether or not the elements contained in the contamination exist on the surface of the substrate in response to the input of the spectrum for analysis acquired in Step S1008. Moreover, the estimation unit 210 generates the estimation data indicating the quantitative values of the elements contained in the contamination in response to the input of the spectrum for analysis acquired in Step S1008.

After that, whether or not "i" is 50 is determined (Step S1012). When a determination of "No" is made, "i" is incremented (Step S1014), and the process returns to Step S1006. In this case, a different position on the substrate is further irradiated with the primary X-rays, and the spectrum for analysis is acquired again. Meanwhile, when a determination of "Yes" is made in Step S1012, the process proceeds to Step S1016.

When the items of estimation data at the 50 positions on the substrate have been generated (Yes in Step S1012), all the items of estimation data are output (Step S1016). Specifically, an estimation result indicating whether or not the elements contained in the contamination exist, and the quantitative values of those elements at each position on the surface of the substrate, is displayed on a display unit (not shown).

With the processing steps described above, through use of the estimation method of FIG. 10, the spectrum for analysis can be acquired in a short time, and the learned estimation unit 210 can be used to make the estimation without parameter fitting and the like by the analysis unit 206. Thus, it is possible to quickly and easily analyze whether or not the elements contained in the contamination exist, and the quantitative values of the elements, if any, at a large number of positions on the substrate.

The case in which the intensities of the fluorescent X-rays are measured at the 50 different positions on the substrate has been described with reference to FIG. 10, but the number of measurement positions may exceed or fall below the 50 positions.

Subsequently, an Example of the present invention will be described.

[Acquisition Conditions for Teacher Data]

The spectrum included in the teacher data is data actually measured through use of TXRF-V310 and TXRF 3760, which are total reflection X-ray fluorescence spectrometers produced by Rigaku corporation (trademark). A target included in a tube of the X-ray source 106 used for the measurement is a tungsten target. A tube voltage of the X-ray source 106 is 35 kV, and a tube current thereof is 225 mA. The primary X-rays with which the substrate is irradiated is W-Lb X-rays monochromated by the monochromator 108.

The sample 116 is a plurality of 12-inch silicon substrates and a plurality of 8-inch silicon substrates. The number of measurement points is 297 on an entire surface of the 12-inch substrate (including an edge of the substrate), and 113 points on an entire surface of the 8-inch substrate (including an edge of the substrate). There are three measurement times, specifically, 5 seconds, 10 seconds, and 30 seconds. The number of combinations between the spectrum and the quantitative values (that is, items of teacher data) is 8,896. The quantitative values which are the analysis result are the result of the analysis unit applying the peak fitting to the spectrum acquired by the spectrum acquisition unit. 90 Percent of the 8,896 items of teacher data were used for the learning, and the remaining 10 percent thereof were used for checking the learning result (test data).

[Machine Learning Model]

Figure 11:
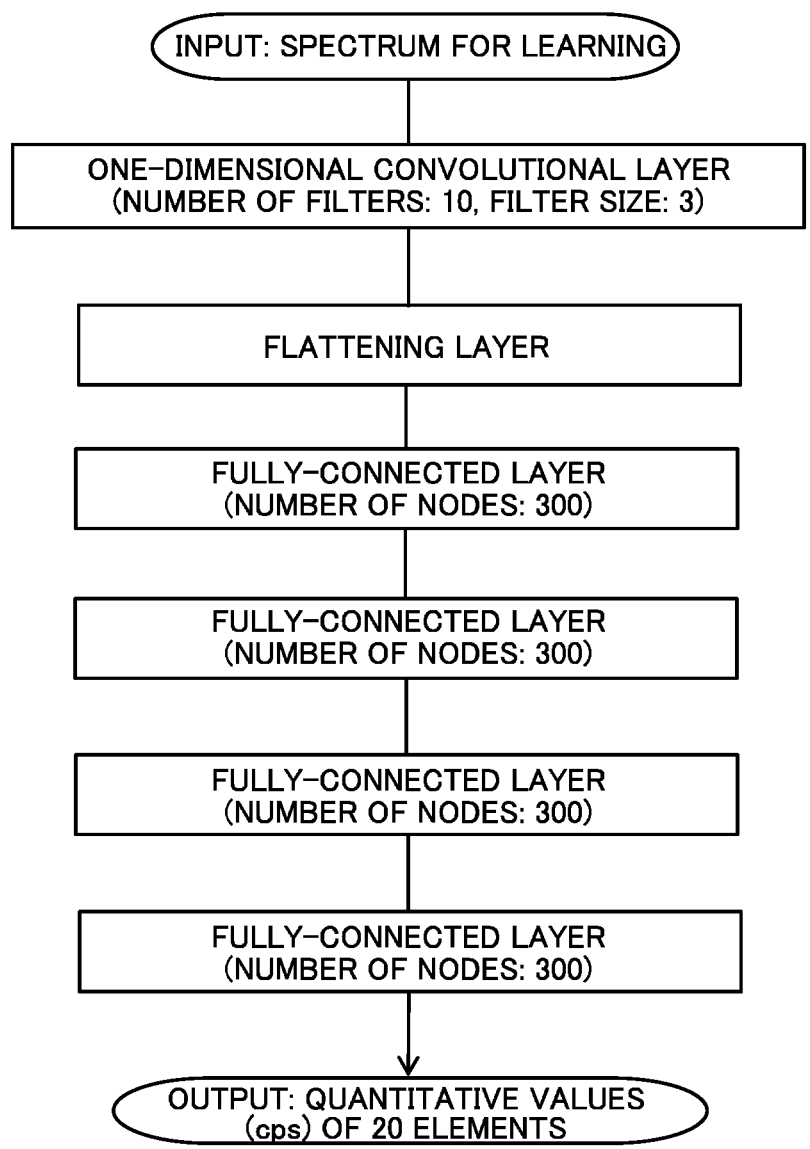
FIG. 11 is a diagram for illustrating a machine learning model used in an Example.

When the machine learning model was built, the TensorFlow was used as a machine learning library. As illustrated in FIG. 11, the machine learning model includes a one-dimensional convolutional layer, a flattening layer, four fully-connected layers each having 300 nodes, and an output layer. The estimation data output by the machine learning model includes quantitative values of 20 elements, which are P, S, Cl, Ar, K, Ca, Sc, Ti, V, Cr, Mn, Fe, Co, Ni, Cu, Zn, In, Sn, I, and Ba. Si is a main element forming the substrate, and is thus not included in the estimation data. In this Example, the machine learning model was built such that the estimation data only including the quantitative values and not including the data indicating whether or not the elements contained in the contamination exist is output. That is, the estimation unit 210 is the machine learning model implemented by the above-mentioned second CNN.

[Transition of Learning]

Figure 12:
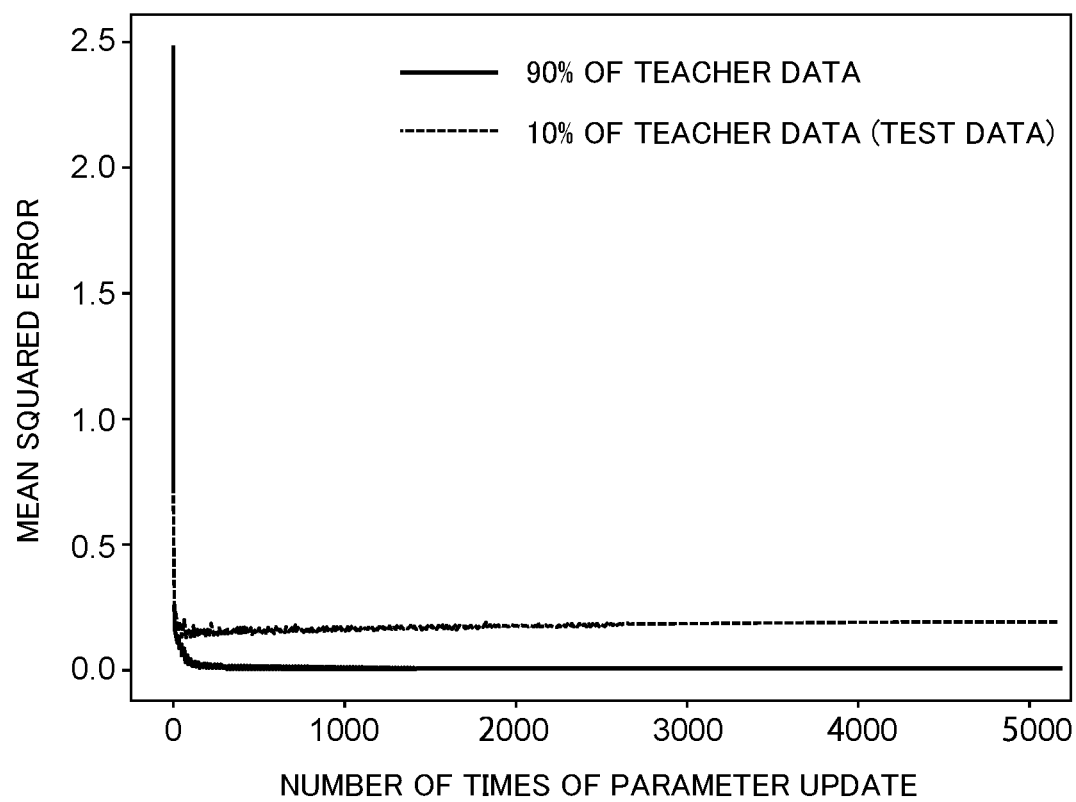
FIG. 12 is a graph for showing transitions of mean squared errors as the learning progresses.

FIG. 12 is a graph for showing transitions of mean squared errors as the learning progresses. In FIG. 12, a vertical axis represents the mean squared error, and a horizontal axis represents the number of times the parameters were updated. Moreover, in FIG. 12, a mean squared error of the data used for the learning (90% of the teacher data) and a mean squared error of the test data (10% of the teacher data) are individually shown. As illustrated in FIG. 12, as the learning progresses, the mean square errors decrease. It is understood that, after learning was executed 5,000 time, the mean squared errors have sufficiently decreased.

[Result of Learning]

Figure 13:
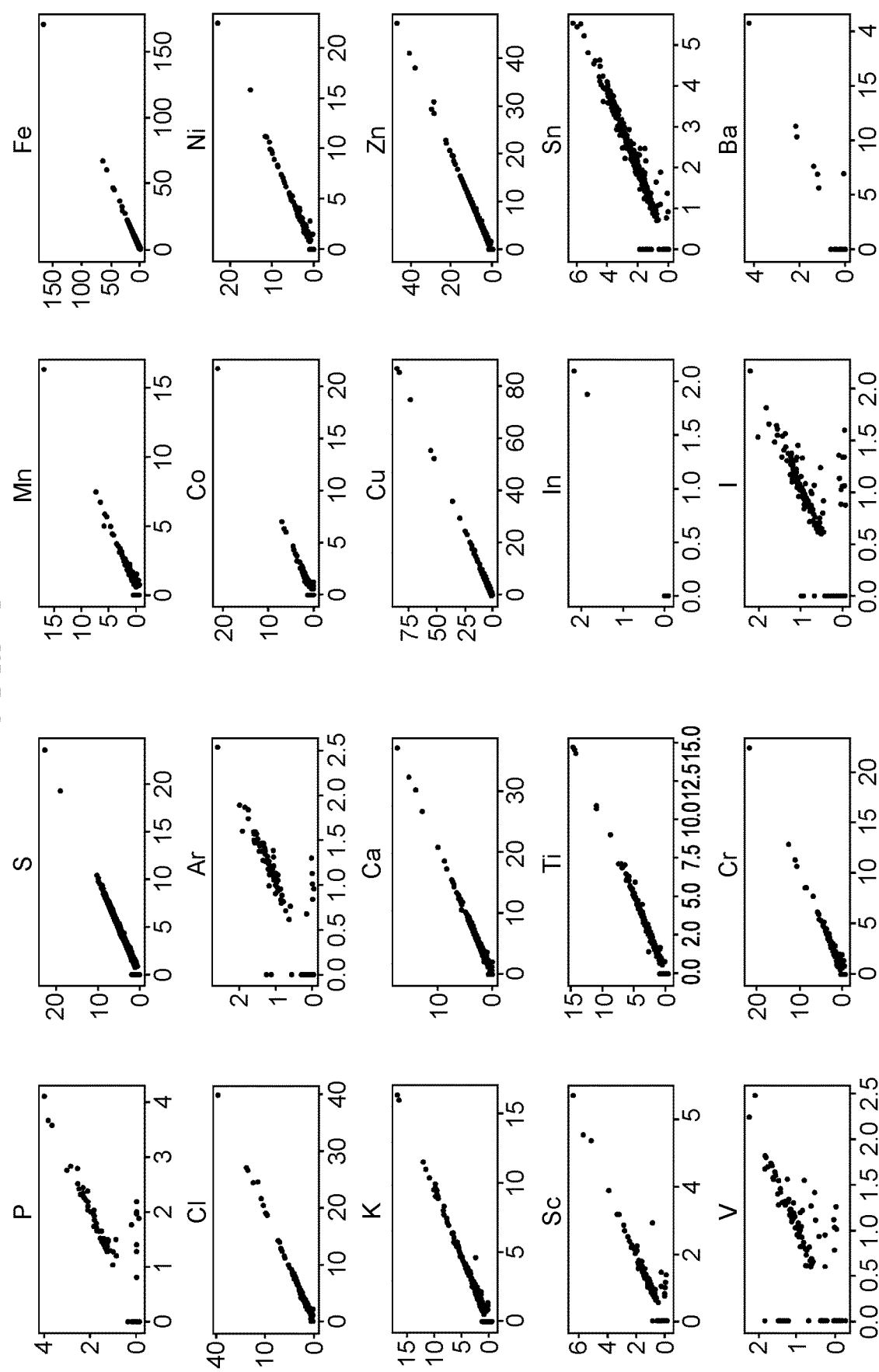
FIG. 13 shows graphs for showing a relationship between estimated quantitative values and true quantitative values.

FIG. 13 shows graphs for showing a relationship between the estimated quantitative values and true quantitative values. Specifically, each of vertical axes of FIG. 13 represents the quantitative value (estimated quantitative value) of each of the elements included in the estimation data output by the estimation unit 210 when the spectrum included in the test data was input to the estimation unit 210. Each of horizontal axes of FIG. 13 represents the quantitative value (true quantitative value) included in the test data. Moreover, FIG. 13 includes graphs of the relationship for the 20 elements. As shown in FIG. 13, the relationship between the estimated quantitative values and the true quantitative values is a linear relationship. That is, the estimated quantitative values and the true quantitative values closely match each other, and hence the estimation result can be considered to be correct.

[Measurement Conditions for Comparison]

In order to verify an accuracy of the measurement result through use of the above-mentioned learned machine learning model, the same position of the same substrate was irradiated with the primary X-rays for 5 seconds or 60 seconds, to thereby acquire two types of spectra. Those two types of spectra were acquired at 117 positions of the same substrate. A measurement device was TXRF 3760, which is the total reflection X-ray fluorescence spectrometer produced by Rigaku corporation (trademark). The other measurement conditions are the same as the conditions described as the acquisition conditions for the teacher data.

[Comparison Result]

Figure 14:
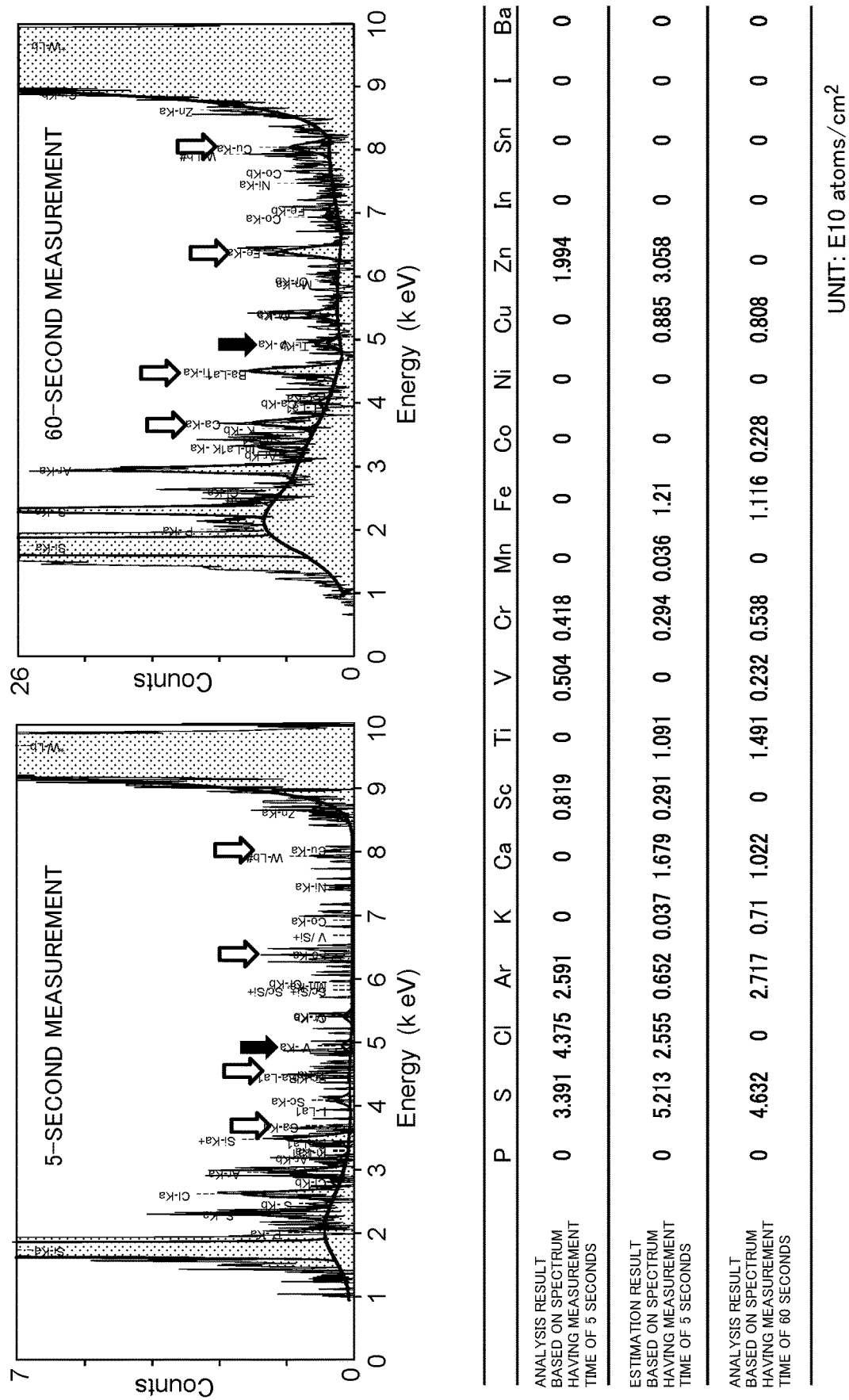
FIG. 14 shows graphs and a table for showing a comparison result between the related art and the present invention.

A spectrum on the left side of FIG. 14 is a spectrum acquired under the above-mentioned measurement conditions, and has the measurement time of 5 seconds. A spectrum on the right side of FIG. 14 is a spectrum acquired under the above-mentioned measurement conditions, and has the measurement time of 60 seconds.

A table on a lower side of FIG. 14 is a table for showing a comparison among intensities of fluorescent X-rays, each of which is unique to each element. An uppermost row of the table represents intensities (analysis results) each acquired by the analysis unit 206 applying the peak fitting to the spectrum having the measurement time of 5 seconds. A center row of the table represents intensities (estimation results) each included in the estimation data output by the learned estimation unit 210 in response to the input of the spectrum having the measurement time of 5 seconds. A lowermost row of the table represents intensities (analysis results) each acquired by the analysis unit 206 applying the peak fitting to the spectrum having the measurement time of 60 seconds. It is hereinafter assumed that the intensities acquired by the analysis unit 206 applying the peak fitting to the spectrum having the measurement time of 60 seconds are true values.

In the analysis result based on the spectrum having the measurement time of 5 seconds, Ca, Ti, Fe, and Cu are not detected. Meanwhile, in the estimation result based on the spectrum having the measurement time of 5 seconds, Ca, Ti, Fe, and Cu are detected. Further, in the analysis result based on the spectrum having the measurement time of 60 seconds, Ca, Ti, Fe, and Cu are detected (see the arrows of the graph). Thus, even when the measurement time is reduced from 60 seconds to 5 seconds, Ca, Ti, Fe, and Cu can be detected. That is, it can be considered that detection sensitivity was increased through the machine learning.

Meanwhile, in the analysis result based on the spectrum having the measurement time of 5 seconds, V is detected. In the estimation result based on the spectrum having the measurement time of 5 seconds, V is not detected (see the arrow of the graph). Further, in the analysis result based on the spectrum having the measurement time of 60 seconds, V is detected. Thus, it can be considered that the learned estimation unit overlooked the existence of V.

Table 1 is a table for showing a result of tabulation of the determination of whether or not the above-mentioned 20 elements exist based on the spectra acquired at the 117 measurement positions. In this case, when the quantitative value is equal to or larger than 1 cps, a corresponding element is determined to exist. In Table 1, the analysis result and the estimation result based on the spectrum having the measurement time of 5 seconds are compared with the analysis result based on the spectrum having the measurement time of 60 seconds.

As shown in Table 1, when the analysis result and the estimation result based on the spectrum having the measurement time of 5 seconds are compared, the estimation result has higher sensitivity at 13 positions than the analysis result, and hence has a smaller number of overlooked elements by the 13 positions. Moreover, the estimation result has a smaller number of qualitative errors by 40 positions than the analysis result.

TABLE 1

| | | Result based on spectrum having measurement time of 5 seconds | | | |
|---|---|---|---|---|---|
| | | Analysis result | | Estimation result | |
| | | Present | Absent | Present | Absent |
| Analysis result based on spectrum having measurement time of 60 seconds | Present (742 positions) | 430 | 163 | 443 | 150 |
| | Absent (1,598 positions) | 94 | 1653 | 54 | 1693 |

As described above, in order to determine whether or not the contamination exists on the substrate, the peak fitting by the analysis unit 206 was required. However, the inventors have discovered that whether or not the contamination exists on the substrate can be determined without fitting to a spectrum acquired in a predetermined environment by using the spectrum acquired in the predetermined environment to execute learning.

That is, when an analysis target is a substrate having a flat surface such as a silicon substrate, and a spectrum including peaks caused by the elements contained in the contamination which adheres to the surface of this substrate is acquired through use of the total reflection X-ray fluorescence analysis, remarkable scattering of the fluorescent X-rays does not occur. In this case, it has been found that whether the peak included in the spectrum is caused by the element contained in the contamination or noise can be determined by the learned estimation unit 210 without employing the related-art method which uses the fitting.

Figure 15:
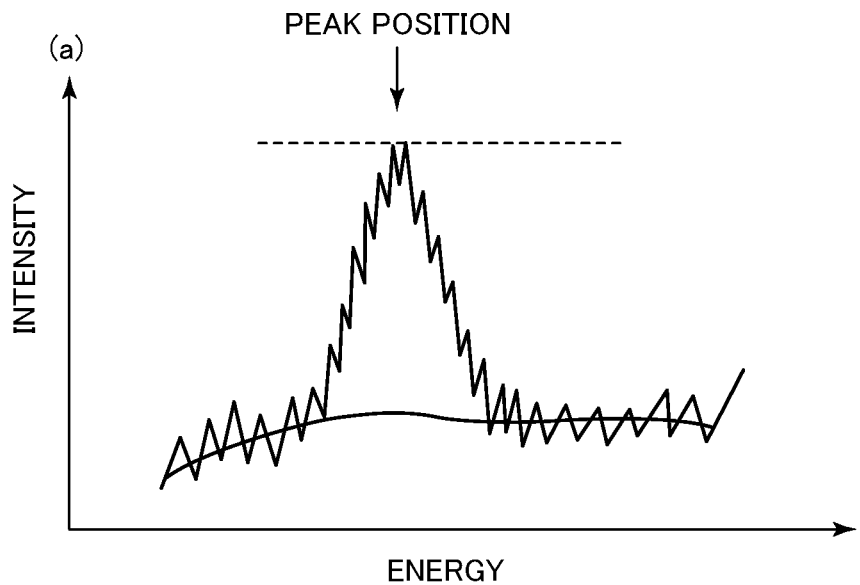
FIG. 15 are graphs for showing determination of whether or not a peak exists.
Figure 15:
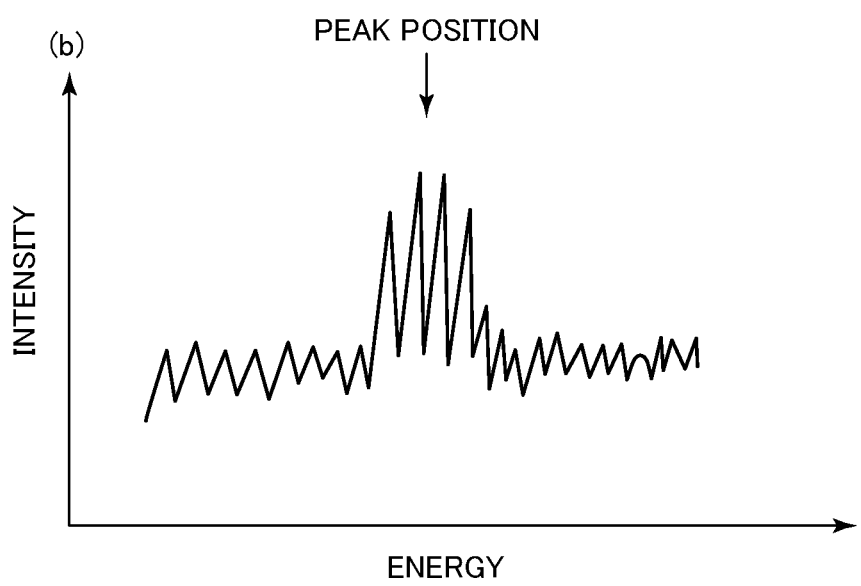

Specifically, for example, it is possible to estimate a background intensity at a peak position based on, for example, intensities before and after the peak position and a variation in the intensity caused by the noise. As shown in FIG. 15(a), when the intensity at the peak position is higher than the background intensity (that is, the spectrum rises upward), it can be determined that a peak exists.

Moreover, as shown in FIG. 15(b), there is a case in which whether or not the intensity at the peak position is higher than the background intensity cannot easily be determined. Even in this case, when the variation in the intensity caused by the noise at the peak position is larger than the variation in the intensity caused by the noise at positions before and after the peak position, it can be determined that a peak exists.

Further, when a specific element is contained, elements highly likely to coexist with this specific element exist. For example, stainless steel is an alloy of Fe, Ni, and Cr, and is contamination highly likely to adhere to the substrate surface in production of, and in a processing step for, the silicon substrate. When it is determined that a peak caused by Fe is included in a spectrum, coexisting Ni and Cr are highly likely to exist, and hence it can be determined that peaks caused Ni and Cr are highly likely to exist.

Moreover, a plurality of fluorescent X-rays emitted from one element exist. For example, as the fluorescent X-rays emitted from Fe, the Fe—Kα line and the Fe—Kβ line exist. Thus, when it is determined that a peak of the Fe—Kα line is included in the spectrum, it can be determined that a peak of the Fe—Kβ line is included.

As described above, the certain laws relating to whether or not a peak is included exist for the spectrum acquired in the above-mentioned environment, and hence the determination by the learning unit 208 can be achieved by using a large number of items of the teacher data to cause the learning unit 208 to learn.

Thus, the present invention is particularly effective in an environment in which the total reflection X-ray fluorescence spectrometer 100 is installed in a clean room, an environment in which the output of the X-ray source 106 is controlled such that the output is constant, and an environment in which the temperature and the humidity in the measurement environment are controlled to be constant.

The present invention can be variously modified without being limited to the above-mentioned Example. The configuration of the total reflection X-ray fluorescence spectrometer 100 has been described as one example, and the present invention is not limited thereto. The configuration may be replaced by a configuration that is substantially the same as the configuration described in the above-mentioned example, a configuration that exhibits the same action and effect as those of the configuration described in the above-mentioned example, or a configuration that achieves the same object as that of the configuration described in the above-mentioned example.

REFERENCE SIGNS LIST 100 total reflection X-ray fluorescence spectrometer, 104 sample stage, 106 X-ray source, 108 monochromator, 110 detection unit, 116 sample, 202 spectrum-for-learning acquisition unit, 204 spectrum-for-analysis acquisition unit, 206 analysis unit, 208 learning unit, 210 estimation unit, 212 parameter storage unit

The invention claimed is:

1. A total reflection X-ray fluorescence spectrometer, comprising:
 a spectrum acquisition unit configured to acquire a first spectrum for learning and a second spectrum for learning representing a relationship between intensities, and energies, of emitted fluorescent X-rays by irradiating a surface of a substrate for teacher data acquisition with primary X-rays at a total reflection critical angle or less, and to acquire a spectrum for analysis representing a relationship between intensities, and energies, of emitted fluorescent X-rays by irradiating a surface of a substrate for analysis with primary X-rays at a total reflection critical angle or less;
 an analysis unit configured to analyze an element contained in contamination based on the second spectrum for learning through use of a fundamental parameter method or a calibration curve method; and
 a learning unit including an estimation unit which is configured to generate estimation data on the element contained in the contamination on the surface of the substrate, for teacher data acquisition when the first spectrum for learning is input or estimation data on the element contained in the contamination on the surface of the substrate for analysis when the spectrum for analysis is input, and for which learning by the estimation unit has been executed based on teacher data and the estimation data generated when the first spectrum for learning is input to the estimation unit,
 wherein positions on the substrate for teacher data acquisition irradiated with the primary X-rays when the first spectrum for learning and the second spectrum for learning are acquired are the same,
 wherein a time for acquiring the first spectrum for learning and the spectrum for analysis is shorter than a time for acquiring the second spectrum for learning, and
 wherein the teacher data is data formed by combining the first spectrum for learning and an analysis result based on the second spectrum for learning.

2. The total reflection X-ray fluorescence spectrometer according to claim 1, wherein the estimation data is data indicating whether the element contained in the contamination exists.

3. The total reflection X-ray fluorescence spectrometer according to claim 1, wherein the estimation data is data representing a quantitative value of the element contained in the contamination.

4. The total reflection X-ray fluorescence spectrometer according to claim 1,
 wherein the substrate for teacher data acquisition and the substrate for analysis are each a silicon substrate, and
 wherein the element contained in the contamination is a plurality of elements determined in advance.

5. An estimation method, comprising:
 a spectrum-for-learning acquisition step of acquiring a first spectrum for learning and a second spectrum for learning representing a relationship between intensities, and energies, of emitted fluorescent X-rays by irradiating a surface of a substrate for teacher data acquisition with primary X-rays at a total reflection critical angle or less;
 a learning step of executing learning for an estimation unit based on teacher data and estimation data generated when the first spectrum for learning is input to the estimation unit;
 a spectrum-for-analysis acquisition step of acquiring a spectrum for analysis representing a relationship between intensities, and energies, of emitted fluorescent X-rays by irradiating a surface of a substrate for analysis for which whether an element contained in contamination exists on the surface is unknown with primary X-rays at a total reflection critical angle or less; and
 an estimation data generation step of generating, using the estimation unit, the estimation data in response to input of the spectrum for analysis,
 wherein positions on the substrate for teacher data acquisition irradiated with the primary X-rays when the first spectrum for learning and the second spectrum for learning are acquired are the same,
 wherein a time for acquiring the first spectrum for learning and the spectrum for analysis is shorter than a time for acquiring the second spectrum for learning, and
 wherein the teacher data is data formed by combining the first spectrum for learning and an analysis result based on the second spectrum for learning.

6. The estimation method according to claim 5, wherein a plurality of items of the teacher data are acquired based on the same measurement point of one substrate for teacher data acquisition.

* * * * *